United States Patent [19]

Sala

[11] Patent Number: 5,621,972
[45] Date of Patent: Apr. 22, 1997

[54] BUTTER PAT DISPENSER

[76] Inventor: Ochier H. Sala, 739 Broadview Ter., Hartford, Conn. 06106

[21] Appl. No.: 541,332

[22] Filed: Oct. 10, 1995

[51] Int. Cl.⁶ ........................................... A21C 5/00
[52] U.S. Cl. .................. 30/116; 30/125; 83/648; 83/651.1
[58] Field of Search ................ 30/115, 116, 125; 222/386, 80, 81; 83/167, 437, 651.1, 648

[56] References Cited

U.S. PATENT DOCUMENTS

| | | | |
|---|---|---|---|
| 1,679,004 | 7/1928 | Pinkel et al. | 30/116 |
| 1,846,423 | 2/1932 | Harrington | 30/115 |
| 2,580,864 | 1/1952 | Upright | 30/115 |
| 2,723,454 | 11/1955 | Janossy . | |
| 2,737,721 | 3/1956 | Hart . | |
| 4,513,501 | 4/1985 | Lee | 30/115 |
| 4,697,488 | 10/1987 | Cole | 30/116 |
| 4,960,024 | 10/1990 | Holcomb . | |

OTHER PUBLICATIONS

"Cut–A–Pat", HK4869, Apr., 1951, Miles–Kimball Catalogue.

Primary Examiner—Hwei-Siu Payer
Attorney, Agent, or Firm—Chilton, Alix & Van Kirk

[57] ABSTRACT

A butter pat dispenser including a rectangular box-like container having a U-shaped cover and a rectangular plate-like member. An end wall closes the first end of the container and the second end defines an opening. In one embodiment, the first end of the plate is pivotally mounted to the side walls defined by the legs of the cover. In another embodiment, side edge portions of the plate are received in longitudinally extending grooves in the interior surface of each of the side walls. A driver and a pusher provide means for advancing an end of the stick of butter out of the opening for slicing. The pusher comprises a pusher member disposed in the container and a nut or threaded sleeve disposed exteriorly to the container. The driver comprises a drive rod which is rotatably mounted to the top wall of the container and a knurled knob which is rotatably mounted to the end wall of the container. One end of the drive rod extends into a cavity in the knob. A quantity of teeth (N1) in the cavity engage a quantity of teeth (N2) on the end of the drive rod. Turning the knob causes the drive rod to rotate wherein the pusher nut, which is threadably mounted on a threaded portion of the drive rod, is longitudinally advanced along the drive rod.

14 Claims, 3 Drawing Sheets

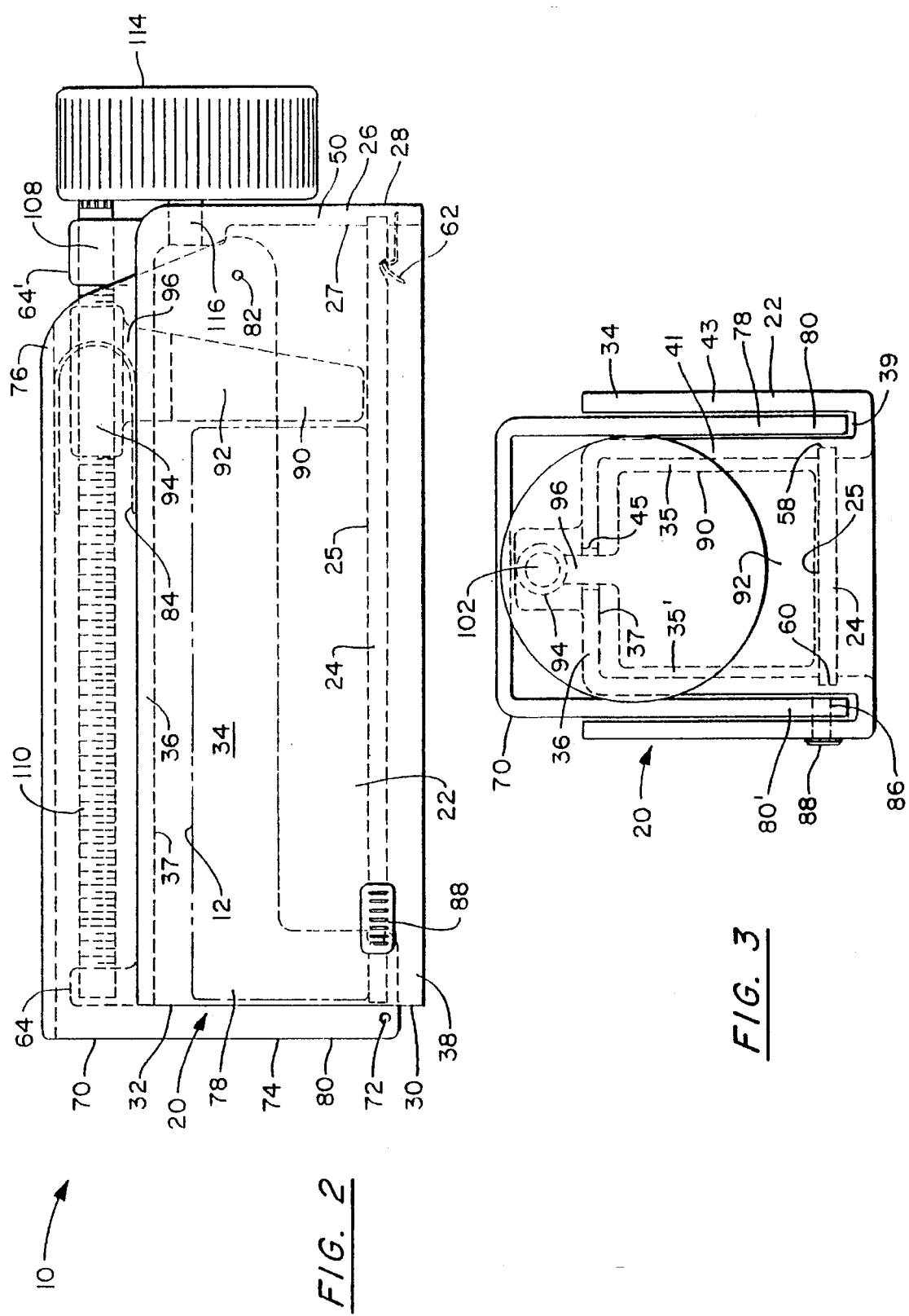

BUTTER PAT DISPENSER

BACKGROUND OF THE INVENTION

This invention relates generally to devices for storing and dispensing slices of bar-shaped soft foods such as butter, margarine or the like. More particularly, the present invention relates to devices for storing and dispensing pats of butter and margarine.

Various types of dispensers for storing and dispensing bars of butter or margarine are known. However, the soft quasi-liquid nature of butter and margarine, especially at room temperature, imposes limitations on the usefulness of conventional apparatus. Butter and margarine adhere to surfaces that they contact. When a stick of such material is pushed out of a container, a film of butter or margarine is left on these surfaces. Therefore, butter and margarine dispensers require frequent and careful cleaning to ensure that such deposits do not turn rancid. In addition, butter and margarine are easily pushed through orifices, butt-joints, and other such irregularities in the dispenser and can foul areas of dispensers which are not intended to come into contact with the butter or margarine.

U.S. Pat. No. 2,737,721 shows a slicing and storing device having a container body composed of left-hand and right-hand halves to facilitate disassembly. Although such design permits cleaning of the device, parts may be easily lost or misplaced while the container is disassembled and the requirement to complete disassemble and reassemble the container each time it is cleaned is cumbersome. In addition, a channel is formed under the floor of the container body to house a portion of the metal tape which is used to push the butter out of the container. Butter or margarine is easily pushed into this channel through the butt-joint formed between the two body halves. Similarly, U.S. Pat. No. 2,723,454 shows a butter slicer having a hinged container. A conveyor is used to push the butter out of the container. Deposits of butter on the conveyor will be wiped onto the floor of the container as the conveyor moves the butter. The conveyor assembly must be removed from the container to provide access for cleaning.

U.S. Pat. No. 4,513,501 shows a slicing and storing device having an integral rectangular box-like container. A cruciform pusher is used to push the butter out of the container. The only access for cleaning the interior of the container is through the open end of the container. The pusher disposed in the container interferes with this access. Similarly, U.S. Pat. No. 2,580,864 shows a dispenser for foods such as cheese, margarine and butter having an integral box-like container whose only access is through the opening. In addition, the screw used to push the food out of the container is disposed within the container. The thread of such a screw is easily fouled with the food and is extremely difficult to clean. Food materials which are missed during cleaning may contact new food materials placed in the container, contaminating the new food.

SUMMARY OF THE INVENTION

Briefly stated, a butter pat dispenser in accordance with the invention comprises a rectangular box-like container having a U-shaped cover and a rectangular plate-like member. An end wall closes the first end of the container and the second end defines an opening. The legs and bight of the cover define the two longer side walls and the top wall of the rectangle, respectively. The plate may be mounted to lower portions of the side walls to define the bottom wall of the rectangle.

In the one embodiment, the first end of the plate is pivotally mounted to the side walls and the second end is mounted to the side walls by a latch. In another embodiment, side edge portions of the plate are received in longitudinally extending grooves in the interior surface of each of the side walls. The plate is latched to the second end of the dispenser to prevent the plate from sliding out of the dispenser while the butter is being dispensed. These embodiments allow the bottom wall of the container to either be displaced (by pivoting the second end of the plate) or removed (by sliding the plate out of the grooves), providing complete access to the interior of the container for cleaning.

A U-shaped cutter arm mounting a cutter is provided for slicing the butter. One end of the cutter arm is pivotally mounted to the side walls of the container wherein a cutter mounted on the other end of the cutter arm is adjacent the container opening. A spring engages the cutter arm and the top wall to bias the cutter away from the container.

A driver and a pusher provide means for advancing an end of the stick of butter out of the container for slicing. The pusher comprises a pusher member disposed in the container, a nut or threaded sleeve disposed exteriorly to the container, and an extension member which laterally extends from the pusher member through a slot in the top of the container to the nut.

The driver comprises a drive rod which is rotatably mounted to the top wall of the container. One end of the drive rod extends beyond the end wall of the container and has a quantity (N2) of splines or teeth radially extending therefrom. A knurled knob or dial is rotatably mounted to the end wall of the container. A cavity in the face of the knob adjacent the end wall defines an interior circumferential surface having a quantity (N1) of teeth radially extending therefrom. The teeth on the drive rod engage the teeth on the knob.

Turning the knob causes the drive rod to rotate wherein the pusher nut, which is threadably mounted on a threaded portion of the drive rod, is longitudinally advanced along the drive rod. The thread pitch on the drive rod, N1 and N2 are selected such that the pusher member is displaced a predetermined distance for a predetermined rotation of the knob wherein a known quantity of butter is dispensed.

In one embodiment, one complete rotation of the knob will advance the pusher member forward a distance of 0.578125 inches, wherein the volume of butter which will be cut from the stick is equal to one tablespoon. Preferably, the container in this embodiment includes a flexible rod which extends from the end wall and which contacts three laterally spaced protrusions in the knob cavity as the knob is rotated, emitting a vibration and a clicking sound. Since there are three teaspoons in a tablespoon, each click or vibration signifies that one teaspoon of butter has been advanced.

An object of the invention is to provide a new and improved butter pat dispenser.

Another object of the invention is to provide a new and improved butter pat dispenser which provides complete access to the interior surfaces therein to facilitate cleaning.

A further object of the invention is to provide a new and improved butter pat dispenser which dispenses measured amounts of butter without recourse to visual indicia.

Other objects and advantages of the invention will become apparent from the drawings and specification.

BRIEF DESCRIPTION OF THE DRAWING

The present invention may be better understood and its numerous objects and advantages will become apparent to those skilled in the art by reference to the accompanying drawing in which:

FIG. 2 is a side view, partly in phantom, of a second embodiment of the butter pat dispenser of FIG. 1, wherein the cutter arm is locked in the lowered position;

FIG. 3 is an end view, partly in phantom, of the butter pat dispenser of FIG. 2;

DETAILED DESCRIPTION OF THE PREFERRED EMBODIMENT

Figure 1:
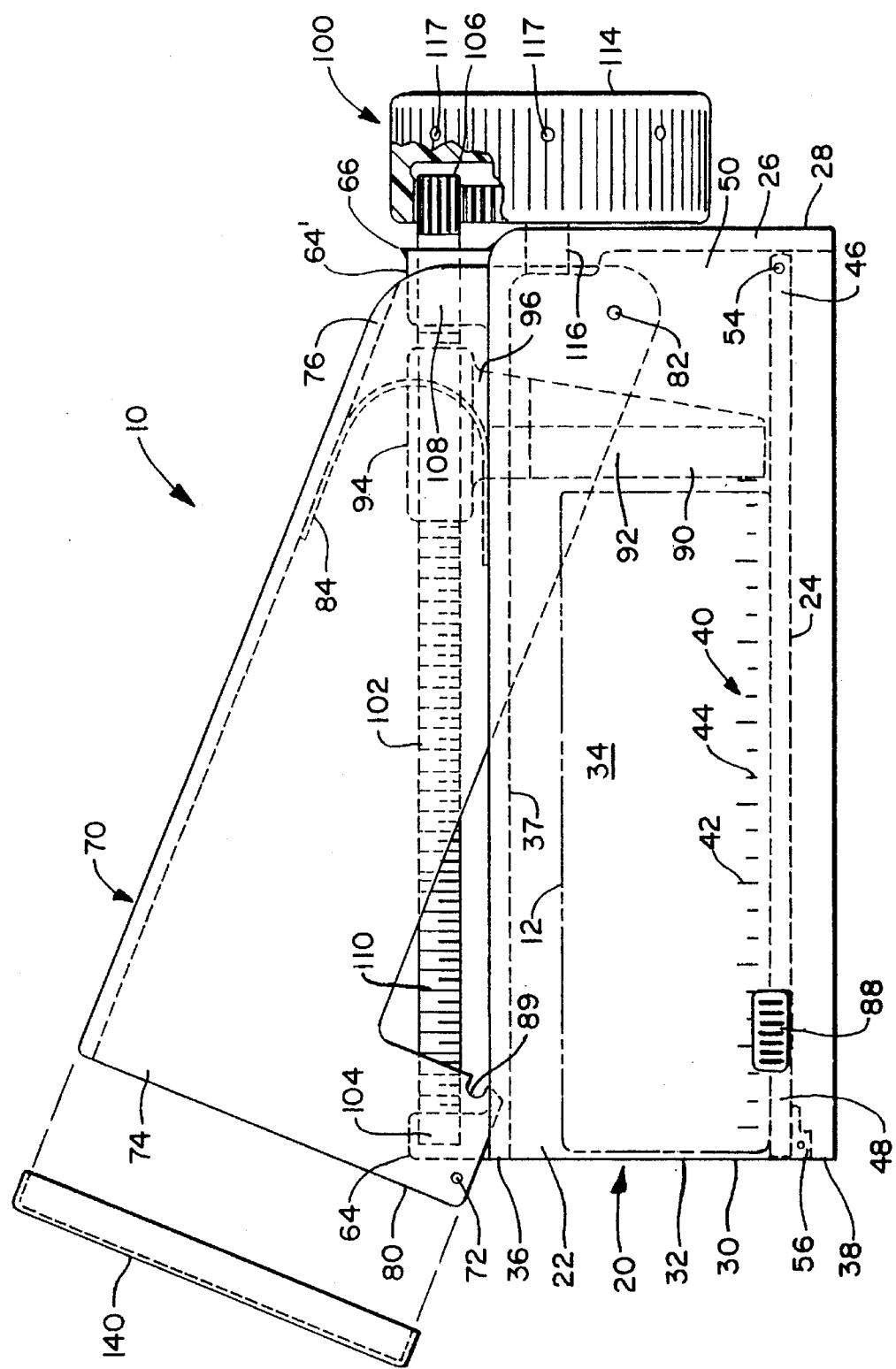
FIG. 1 is a side view, partly in phantom, of a first embodiment of a butter pat dispenser in accordance with the invention, wherein the cutter arm is in the raised position.

With reference to the drawings wherein like numerals represent like parts throughout the several figures, a butter pat dispenser in accordance with the present invention is generally designated by the numeral 10. The dispenser 10 comprises a rectangular box-like container 20 having an inverted U-shaped cover 22 covering a rectangular plate-like member 24. An end wall 26 closes the first end 28 of the container 20 and the second end 30 defines an opening 32. The legs and bight of the cover 22 define the two longer side walls 34 and the top wall 36 of the container 20, respectively. The plate 24 may be mounted to lower portions 38 of the side walls 34 to define the bottom wall of the container 20.

In a preferred embodiment, the cover 22 is composed of a transparent polymeric material. At least one of the side walls 34 is provided with a scale 40 having indicia for tablespoons 42 and teaspoons 44. The quantity of butter which has been dispensed may be determined by comparing the relative location of the rear end of the butter with respect to the indicia before moving the butter and after moving the butter. Alternatively, the cover 22 may be composed of a non-transparent polymeric material, stainless steel or the like. The quantity of butter which is dispensed from such a dispenser may be determined in the manner discussed below.

In the embodiment shown in FIG. 1, a first end portion 46 of the plate 24 is pivotally mounted on pins 54 to the interior surface 35 (FIG. 3) of the side walls 34 at the first end 50 of the cover 22. The end portion 48 of the plate 24 is mounted to the interior surface 35 of the side walls 34 by a latch 56. As shown in FIG. 1, the latch 56 may comprise a bar having end portions which are received in grooves in the interior surface 35 of the side walls 34. Alternatively, other suitable means of latching the second end portion 48 may be utilized. Butter may be loaded into the dispenser by unlatching the second end portion 48 of the plate 24, pivoting the second end portion 48 downward, placing the bar of butter on the interior surface 25 of the plate 24, closing and latching the second end portion 48.

In the embodiment shown in FIGS. 2 and 3, side edge portions 58 of the plate 24 are received in longitudinally extending grooves 60 in the interior surface 35 of each of the side walls 34. The first end portion 46 of the plate 24 is latched to the first end portion 50 of the cover 22 by a spring clip 62, or similar means, to prevent the plate 24 from sliding out of the dispenser 10 while the butter is being dispensed. Butter may be loaded into the dispenser 10 by removing the plate 24 from the dispenser 10, placing the bar on the interior surface 25 of the plate 24, and replacing the plate 24 in the dispenser 10. The plate 24 may also be used as a butter plate while it is separate from the dispenser 10.

The embodiments of FIGS. 1 and 2 allow the bottom of the container to either be displaced (by pivoting the second end portion 48 of the plate 24) or removed (by sliding the plate 24 out of the grooves 60), providing complete access to the interior surfaces 25, 27, 35, 37 of the container 20 for cleaning. All surfaces 25, 27, 35, 37 that can come into contact with the butter may be reached with common cleaning implements such as cloths or sponges without any further disassembly. Alternatively, the dispenser 10 may be cleaned in a dish washing machine since the water jets directly contact all of the interior surfaces 25, 27, 37 and 35 of the container 10.

Commercially prepared sticks 12 of butter and margarine are generally sold as quarter pound sticks 12 having dimensions substantially equal to 1.25 inches by 1.25 inches by 4.625 inches. The distance between opposing interior surfaces 25, 27 and 35, 35' in the container 20 are selected such that a gap will exist between the top and side surfaces of the stick 12 and the interior surface of the top and sides 37, 35, 35' when the stick 12 is centered in the container 20. In a preferred embodiment the distance between the side walls 35, 35' is 1.5 inches and the distance between the top and bottom walls 25, 37 is 1.5 inches. Consequently, the stick 12 generally contacts only the interior surface 25 of the plate 24. This design greatly simplifies the cleaning of the dispenser 10. It should be appreciated that dispensers in accordance with the present invention may be produced to accommodate brands of butter having non-standard size sticks.

A U-shaped cutter arm 70 mounting a cutter 72 is provided for slicing the butter 12. At the cutter end 74, the cutter arm 70 extends beyond the container 20 and the legs 78 define a pair of laterally extending arms 80. A cutter 72, such as a blade or a wire, is mounted between the arms 80. At the end 76 opposite to the cutter end 74, the legs 78 are pivotally mounted to the side walls 34 of the container 20 by pins 82, wherein the cutter is adjacent the container opening 32. A spring 84 which engages a surface of the cutter arm 70 and the exterior surface of the top wall 36, biases the cutter end 74 of the cutter arm 70 to the position shown in FIG. 1 wherein the cutter 72 is adjacent the top of the container 20. Depressing the cutter arm 70 causes the cutter 72 to traverse the opening 32 to a position adjacent the bottom of the container 20, cutting off any butter which extends beyond the container 20. In a preferred embodiment, a longitudinally extending channel 39 in each side wall 34, which define inner and outer walls 41, 43, partially receives the legs 78 of the cutter arm 70 as shown in FIG. 3. A pin 86 mounted to a latch 88 extends into the channel 39 and may be engaged with a notch 89 in one of the arms 80' to lock the cutter end 74 in the position shown in FIG. 2. A cap 140 may be placed over the end of the cutter arm 70 to close the container.

A driver 100 and a pusher 90 provide means for advancing an end of the stick of butter out of the container 20 for slicing. The pusher 90 comprises a pusher member 92 disposed in the container 20, a nut 94 or threaded sleeve disposed exteriorly to the container 20, and an extension member 96 which laterally extends from the pusher member 92 through a slot 45 in the top wall 36 of the container to the nut 94. The square face of the pusher member 92 is engageable with one of the ends of the stick of butter to push the opposite end of the stick through the container opening 32.

Figure 4:
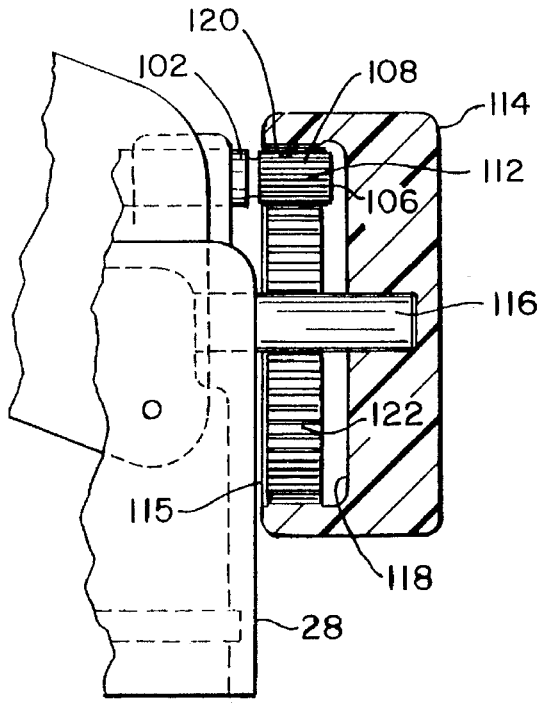
FIG. 4 is an enlarged side view, partly in cross section, of the dial and shaft first end portion of FIG. 1.

A pair of drive mounts 64 laterally extend from the top wall 36 of the container 20. A first end portion 104 of a drive rod 102 is journaled in the first drive mount 64 and a portion 108 of the rod 102 intermediate the first and second end portions 104, 106 is journaled in the second drive mount 64'. The rod 102 has a threaded portion 110 intermediate the drive mounts 64, 64'. The pusher nut 94 is threadably mounted on the threaded portion 110 of the drive rod 102. The second end portion 106 of the rod 102 extends beyond the end wall 26 of the container 20 and has a quantity (N2) of splines or teeth 112 radially extending therefrom as shown in FIG. 4.

A knurled knob 114 or dial is rotatably mounted to a shaft 116 which longitudinally extends from the end wall 26 of the container 20. A cavity 118 in the face 115 of the knob 114 adjacent the end wall 26 defines an interior circumferential surface 120 having a quantity (N1) of teeth 122 radially extending therefrom. The teeth 112 on the drive rod 102 engage the teeth 122 on the knob 114. Turning the knob 114 in a clockwise direction as viewed in FIG. 3 causes the drive rod 102 to turn in the clockwise direction wherein the nut 94 is longitudinally displaced along the threaded portion 110 of the drive rod 102 towards the opening 32. Conversely, turning the knob 114 in the opposite direction causes the nut 94 to be displaced towards the end wall 26. In a preferred embodiment, a plurality of radially spaced indicia 117 on the knob 114 and a reference index 66 on the cover 22 provide means for determining how far the knob 114 has been rotated.

It is known that each stick of butter is substantially 4.625 inches long and has a volume of 24 teaspoons or 8 tablespoons. The thread pitch on the drive rod 102, N1 and N2 are selected such that the pusher member 92 is displaced a predetermined distance for a predetermined rotation of the knob 114 wherein a known quantity of butter is dispensed. In one embodiment, one complete rotation of the knob 114 will advance the pusher member 92 forward a distance of 0.19271 inches, wherein the volume of butter which will be cut from the stick is equal to one teaspoon. In another embodiment, one complete rotation of the knob 114 will advance the pusher member 92 forward a distance of 0.578125 inches, wherein the volume of butter which will be cut from the stick is equal to one tablespoon. Consequently, a cook using a dispenser 10 in accordance with the present invention may measure the butter to be added to a recipe by counting the number of times the knob 114 has been rotated.

Figure 5:
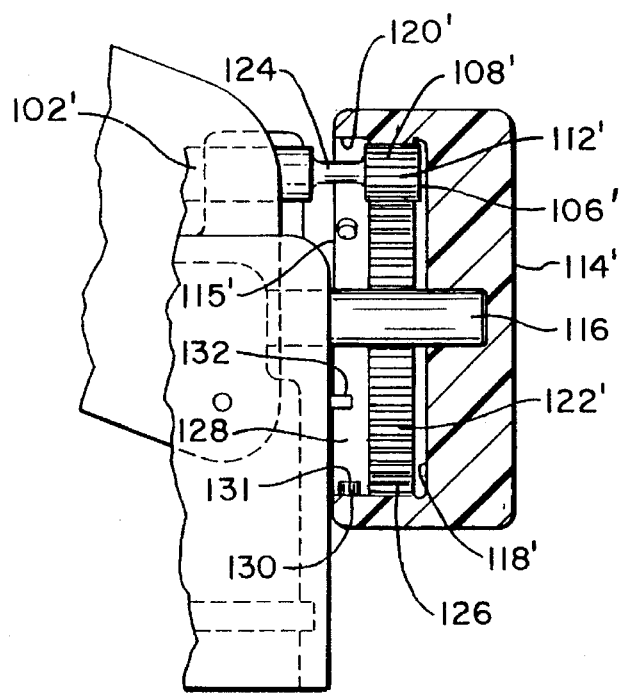
FIG. 5 is an enlarged side view, partly in cross section, of an alternative embodiment of the dial and shaft first end portion of FIG. 1.

In the embodiment of FIG. 5, the drive rod 102' includes a portion having a reduced diameter 124 intermediate the second drive mount 64' and the teeth 112'. The interior circumferential surface 120' is divided into a first portion 126 having the teeth 112' and a second portion 128 intermediate the first portion 126 and the face 115' of the knob 114'. Three laterally spaced protrusions 130 extend from the second portion 128 into the cavity 118'. The protrusions 130 have a height which is greater than the height of the teeth 112' on the circumferential surface 120'. A flexible rod 132 extends from the end wall 26 of the container 20 into the cavity 118' wherein the rod 132 engages the tip 131 of each protrusion 130 as the knob 114' is rotated, emitting a vibration and a "clicking" sound. This embodiment may be used in the dispenser described above wherein a tablespoon of butter is dispensed with each complete rotation of the knob 114'. Since there are three teaspoons in a tablespoon, each click or vibration signifies that one teaspoon of butter has been advanced.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A dispenser for dispensing measured pats from a stick of butter or margarine comprising:

an elongated container defining an exterior and an interior, said container having a plurality of side portions, a closed end portion and an open end, said side portions comprising a first pair of oppositely disposed side portions defining a top panel and a bottom panel and a second pair of oppositely disposed side portions defining first and second side panels, said top panel defining a longitudinally extending slot, said bottom panel comprising a plate, said plate being mountable to said first and second side panels;

cutting means moveable between a first position adjacent a one of said side portions and a second position adjacent an oppositely disposed side portion; and advancement means for advancing the stick through said open end comprising pusher means and driver means mounted exteriorly of said container, said pusher means comprising a pusher member disposed in said container, an extension member extending through said slot, and an engagement member defining a threaded longitudinal bore, said driver means comprising knob means rotatably mounted to said exterior of said container, said knob means defining a cylindrical void and an interior circumferential surface, said interior surface comprising a quantity of radially extending first teeth wherein said quantity of said first teeth equals N1, said driver means further comprising rod means rotatably mounted to said container having a first end portion and a threaded portion defining a thread, said thread having a pitch, said threaded portion being received in said bore wherein said threaded portion threadably engages said bore whereby said pusher member is displaced a longitudinal distance upon rotation of said rod means, said first end portion defining a quantity of radially extending second teeth wherein said quantity of said second teeth equals N2, said first end portion being disposed in said void wherein said second teeth engage said first teeth whereby said rod means rotates upon rotation of said knob means;

wherein said bottom panel is at least partially dismountable from said first and said second side panels whereby access is provided to said interior of said container and wherein said pitch, N1 and N2 are selected such that said pusher member is displaced a predetermined distance for a predetermined rotation of said knob means.

2. The dispenser of claim 1 wherein said container further comprises a resilient rod extending from the exterior of said closed end portion, said rod means further comprises a shaft portion adjacent said first end portion, and said interior circumferential surface further comprises three laterally spaced radially extending protrusions, said shaft portion and said first end portion each having an outside diameter wherein said outside diameter of said first end portion is greater than said outside diameter of said shaft portion, said protrusions having a tip defining a height and wherein said first teeth have a height, wherein said height of said tip of said protrusions is greater than said height of said first teeth, and said resilient rod being positioned wherein said resilient rod engages said tips of said protrusions upon rotation of said knob means.

3. A dispenser for dispensing measured pats from a stick of butter or margarine comprising:

an elongated container having an open end and an exterior surface; and advancement means for advancing the stick through said open end comprising pusher means and driver means, said pusher means comprising a pusher member disposed in said container and an engagement member defining a threaded longitudinal bore, said driver means comprising knob means rotatably mounted to said exterior surface of said container, said knob means defining a cylindrical void and an interior circumferential surface, said interior surface comprising a quantity of radially extending first teeth wherein said quantity of said first teeth equals N1, said driver means further comprising rod means rotatably mounted to said container having a first end portion and a threaded portion defining a thread, said thread having a pitch, said threaded portion being received in said bore wherein said threaded portion threadably engages said bore whereby said pusher member is displaced a longitudinal distance upon rotation of said rod means, said first end portion defining a quantity of radially extending second teeth wherein said quantity of said second teeth equals N2, said first end portion being disposed in said void wherein said second teeth engage said first teeth whereby said rod means rotates upon rotation of said knob means;

wherein said pitch, N1 and N2 are selected such that said pusher member is displaced a predetermined distance for a predetermined rotation of said knob means.

4. The dispenser of claim 3 wherein container comprises a top panel having a longitudinally extending slot, said driver means is mounted exteriorly of said container, and said pusher means further comprises an extension member extending through said slot.

5. The dispenser of claim 3 wherein said rod means further comprises a shaft portion adjacent said first end portion, said shaft portion and said first end portion each having an outside diameter wherein said outside diameter of said first end portion is greater than said outside diameter of said shaft portion.

6. The dispenser of claim 5 wherein said interior circumferential surface further comprises three laterally spaced radially extending protrusions, said protrusions having a tip defining a height and wherein said first teeth have a height, wherein said height of said tip of said protrusions is greater than said height of said first teeth.

7. The dispenser of claim 6 wherein said container further comprises a resilient rod extending from said exterior surface, said resilient rod being positioned wherein said resilient rod engages said tips of said protrusions upon rotation of said knob means.

8. The dispenser of claim 3 wherein said pusher member is displaced a distance substantially equal to 0.578 inches when said knob means is rotated 360 degrees.

9. The dispenser of claim 3 wherein said pusher member is displaced a distance substantially equal to 0.193 inches when said knob means is rotated 360 degrees.

10. The dispenser of claim 3 wherein said container further comprises index means and said knob means further comprises a plurality of radially spaced indicia.

11. A dispenser for dispensing a pat from a stick of butter or margarine comprising:

an elongated container having an elongated bottom plate on which the stick is to be placed and an elongated cover mounted to the plate and which together with the plate substantially encapsulate the stick except that the cover has an open end, said cover and said plate defining an interior surface, said cover comprising a pair of oppositely disposed side panels and a top panel, said top panel being oppositely disposed to said plate, said plate comprising oppositely disposed first and second end portions, and mounting means for pivotally mounting said first end portion to said side panels;

means mounted on the container for advancing the stick through said open end; and latch means for selectively latching and unlatching said second end portion of said plate to said side panels, wherein said second end portion is unlatched to partially dismount said plate from said cover, whereby access is provided to said interior surface of said container.

12. A dispenser for dispensing a pat from a stick of butter or margarine comprising:

an elongated container having an elongated bottom plate on which the stick is to be placed and an elongated cover mounted to the plate and which together with the plate substantially encapsulate the stick except that the cover has an open end, said cover and said plate defining an interior surface, said cover comprising a pair of oppositely disposed side panels and a top panel, said top panel being oppositely disposed to said plate;

means mounted on the container for advancing the stick through said open end;

means for selectively locking and unlocking the mounting of said cover to said plate, wherein the plate is at least partially separable from the cover, whereby access is provided to said interior surface of said container; and cutting means moveable between a first position adjacent said top panel and a second position adjacent said plate, said cutting means comprising a U-shaped member having a first and a second side segments, said side segments each having opposite first and second end portions, said first side segment first end portion and said second side segment first end portion each being pivotally mounted to a respective one of said side panels.

13. The dispenser of claim 12 wherein each of said second end portions comprises an arm and said cutting means further comprises blade means having opposite first and second ends, said first and said second ends of said blade means being mounted to said arms of said first and said second side segments, respectively.

14. The dispenser of claim 13 wherein one of said arms comprises a notch and said container further comprises latch means engageable with said notch for latching said U-shaped member in a fixed position.

* * * * *